(12) United States Patent
Handl

(10) Patent No.: US 8,680,170 B2
(45) Date of Patent: Mar. 25, 2014

(54) BODY, PARTICULARLY MOLDED BODY MADE OF POLYSTYRENE

(75) Inventor: Werner Handl, Altdorf (DE)

(73) Assignee: Total Research and Technology Feluy, Seneffe (BE)

( * ) Notice: Subject to any disclaimer, the term of this patent is extended or adjusted under 35 U.S.C. 154(b) by 136 days.

(21) Appl. No.: 13/119,654

(22) PCT Filed: Sep. 16, 2009

(86) PCT No.: PCT/EP2009/006677
§ 371 (c)(1),
(2), (4) Date: May 5, 2011

(87) PCT Pub. No.: WO2010/031537
PCT Pub. Date: Mar. 25, 2010

(65) Prior Publication Data
US 2011/0213045 A1     Sep. 1, 2011

(30) Foreign Application Priority Data

Sep. 17, 2008  (DE) .................. 10 2008 047 594

(51) Int. Cl.
C08J 9/22 (2006.01)
C08J 9/00 (2006.01)
C08J 9/35 (2006.01)
C08F 12/08 (2006.01)

(52) U.S. Cl.
USPC ............................... 521/151; 521/146; 521/83

(58) Field of Classification Search
USPC ................................ 521/146, 151, 83; 252/62
See application file for complete search history.

(56) References Cited

U.S. PATENT DOCUMENTS

| | | | | |
|---|---|---|---|---|
| 3,968,075 A | * | 7/1976 | Doucette et al. | 523/134 |
| 4,789,046 A | * | 12/1988 | McDowall | 182/230 |
| 5,215,651 A | * | 6/1993 | Yamamoto et al. | 208/126 |
| 5,623,798 A | * | 4/1997 | Crews et al. | 52/294 |
| 6,183,854 B1 | * | 2/2001 | Stiller et al. | 428/312.2 |
| 2008/0234400 A1 | * | 9/2008 | Allmendinger et al. | 521/57 |
| 2009/0029878 A1 | * | 1/2009 | Bicerano | 507/107 |
| 2012/0074347 A1 | * | 3/2012 | Gordon-Duffy | 252/62 |

FOREIGN PATENT DOCUMENTS

| | | |
|---|---|---|
| EP | 0 620 246 | 10/1994 |
| IT | MI 2007 A 1003 | 5/2007 |
| JP | 60-199062 | 10/1985 |
| SU | 1 278 343 | 12/1986 |
| WO | WO 97/45477 | 12/1997 |
| WO | WO 98/51734 | 11/1998 |
| WO | WO 00/43442 | 7/2000 |
| WO | WO 2008/141767 | 11/2008 |
| WO | WO 2009/135695 | 11/2009 |

* cited by examiner

*Primary Examiner* — Randy Gulakowski
*Assistant Examiner* — Kara Boyle

(57) ABSTRACT

The invention relates to a body, particularly a molded body made of polystyrene, particularly polystyrene particle foam or polystyrene hard foam, wherein the polystyrene, particularly the polystyrene particle foam or the polystyrene hard foam, comprises petroleum coke, particularly petroleum coke particles.

11 Claims, No Drawings

BODY, PARTICULARLY MOLDED BODY MADE OF POLYSTYRENE

The invention relates to a body, in particular, a molded body made of polystyrene, in particular, made of polystyrene particle foam or polystyrene hard foam.

In the case of expanded polystyrene particle foam (EPS), the polystyrene granules (polystyrene beads), into which the blowing agent pentane is incorporated by polymerization, is pre-foamed at temperatures exceeding 90° C. This temperature causes the blowing agent to evaporate; and the thermoplastic base material expands up to 20 to 50 times its original volume to form PS foam particles, which are then molded into blocks, boards or molded articles by means of a second hot steam treatment between 110° C. and 120° C. in lines that operate continuously or in the batch mode.

Polystyrene extruder foam or extruded polystyrene hard foam (XPS) is produced in a continuous extrusion process: blowing agent-free polystyrene granules are melted in an extruder and with the addition of a blowing agent are dispensed continuously from a wide slit die. The resulting foam material is homogenous and has a closed cell structure and can be made into blocks, boards or molded articles.

Such foams have already existed for 50 years and are used, in particular, for thermal insulation in the construction industry because of their properties as insulating materials.

Molded bodies that are used for thermal insulation usually have a density of less than 20 kg/m$^3$ in the raw state. In order to reduce the material and volume, there is the need to reduce the raw density even more. However, such densities have significantly worse thermal insulation values. Thus, the thermal conductivity usually exceeds 45 mW/m·K.

A plethora of methods have been proposed to remedy this defect.

For example, the EP0620246 proposes the use of athermanous materials in polystyrene foams. In this case the athermanous materials are also supposed to absorb the infrared rays. The proposed athermanous materials include metallic oxide, non-metallic oxide, metallic powder, aluminum powder, carbon or organic dyes, especially in the form of pigments, or mixtures of these materials. According to the definition, atherman [Greek] is athermanous or impermeable to heat: the property of bodies—not to allow thermal radiation to pass through, but rather to absorb it; opposite: diathermanous. This property does not relate to metallic powder and carbon. Although the carbons, like, carbon black, graphite and diamond, that are named therein, have a certain degree of infrared absorption, they are not capable of reflecting the bulk of the thermal radiation due to their surface structure.

The WO/97/45477 proposes that the carbon black particles be incorporated into the expanded styrene polymerizate. In this case not only the thermal insulation, but predominantly the fire behavior are significantly improved. The crucial disadvantage associated with this method is the high specific surface area of the carbon black particles. Usually carbon black particles have a specific surface area (by BET) of more than 100 m$^2$/g. Such high surface areas absorb the additional necessary flame retardant agents and degrade the rheological behavior during processing. In any case the claimed particle size of the carbon black particles ranging from 80 to 120 nm is ineffective in the infrared range.

According to the teaching of the WO/98/51734, graphite particles are to be introduced into the expandable styrene polymerizate. The graphite that is introduced has preferably an average particle size ranging from 1 to 50 μm, in particular from 2.5 to 12 μm, an apparent density ranging from 100 to 500 g/l and a specific surface area ranging from 5 to 20 m$^2$/g. Natural graphite or ground synthetic graphite is proposed. In the case of a polystyrene foam having a density of 10 g/l the engineering object is to reduce the thermal conductivity of 44 mW/m·K to less than 35 mW/m·K. The drawback with this process is that although it is possible to reduce the thermal conductivity with the introduction of graphite, a limit was reached because of the good intrinsic thermal conductivity of graphite. In addition, higher doses of graphite are not possible, because on reaching the percolation threshold, a deterioration would take place.

The WO/00/43442 proposes the introduction of aluminum in order to improve the thermal insulating properties. Although aluminum particles are capable of insulating the infrared rays, the proposed particle sizes between 1 and 15 μm are very dangerous. There is a high risk of dust explosions during processing; and the necessary fire retardant values are not achieved in the end product. In addition, aluminum particles cannot be used in an aqueous suspension polymerization owing to the formation of hydrogen.

The object of the invention is to provide a body, in particular a molded body made of polystyrene, in particular, made of polystyrene particle foam or polystyrene hard foam, which significantly improves the thermal insulation, reduces the use of flame retardant agents and that additionally is easy to process in all foam molding technologies.

The above described engineering object is achieved with the entire teaching in claim 1.

Advantageous embodiments of the invention are apparent from the dependent claims.

According to the invention, the body, in particular the molded body made of polystyrene, in particular made of polystyrene particle foam or polystyrene hard foam, contains petroleum coke, in particular petroleum coke particles. In particular, ground, calcined petroleum coke is used. Petroleum coke represents a novel infrared blocker and, thus, exhibits improved thermal insulation. This improved thermal insulation may be observed in both bodies made of EPS (polystyrene particle foam) and also those made of XPS (polystyrene hard foam).

Petroleum coke is a residue of petroleum distillation and is produced in so-called crackers. The petroleum coke is liberated from the volatile components through calcination, as a result of which a carbon with a degree of purity of 99% is obtained. Therefore, coke may be regarded as a carbon, but is not included in the allotropic forms. Calcined petroleum coke is neither graphite, because it does not have shiftable layers, nor can it be included in the amorphous carbons, like carbon black. For example, petroleum coke does not have, as compared to graphite, any typical lubricating effect and only exhibits a poor electric and thermal conductivity.

According to the prior art, either anisotropic or isotropic cokes are produced as a function of the production method or more specifically the coker conditions. These cokes—the so-called petroleum cokes—are liberated from the volatile components through heat treatment, usually in rotary kilns. This process is also called calcination. Then, depending on the application, the calcined coke pieces are crushed into tiny pieces or ground into powder in hammer mills. The petroleum cokes are used almost exclusively for the production of electrodes or as carburizing agents in the steel industry.

At this point the present invention found that calcined petroleum cokes can be ground into platelet-like powders with special mills and that these petroleum cokes, like metallic or graphitic platelets, improve the thermal insulation in styrene foams.

Both isotropic and anisotropic cokes are suitable for the use of petroleum cokes as infrared blockers in polystyrene hard foams. Especially preferred are the anisotropic cokes—the so-called needle cokes. Both the grain size and the grain shape are important for use as an infrared blocker. In particular, a platelet-like grain shape shows especially good thermal insulation values. According to the invention, such preferred grain shapes are produced with delamination mills. Such mills are, for example, ball mills or air jet mills. The petroleum cokes according to the invention exhibit an especially high aspect ratio. In the present invention the concept aspect ratio is defined as the ratio of the average diameter to the average thickness of the particles.

A preferred grain size according to the invention is the range between 1 and 50 µm. Preferably the petroleum cokes having an average particle diameter between 1 and 10 µm are used.

The petroleum cokes according to the invention have an aspect ratio between 1 and 500, preferably between 5 and 50.

It has been demonstrated that when ground petroleum cokes are used, not only the thermal insulating effect is significantly improved, but also the quantity of flame retardant agent can be significantly reduced. The products that are used as the flame retardant agents—usually halogenated products—are relatively expensive, so that the inventive molded bodies comprising petroleum coke are considerably less expensive and can also be produced so as to be more environmentally compatible.

It is advantageous for the petroleum coke content to be in a range between 0.5% by weight and 10% by weight based on the finished body or more specifically the molded body, so that the result is a correspondingly lower thermal conductivity.

It is advantageous that the molded body can have a density of less than 40 kg/m$^3$.

The body can exhibit a coefficient of thermal conductivity ranging from 20 to 40 mW/(m·K), in particular, from 25 to 30 mW/(m·K). This coefficient of thermal conductivity is significantly less than the coefficient of thermal conductivity of the corresponding body without petroleum coke. Therefore, the results are correspondingly better thermal insulation values.

The thermal conductivity of the body comprising the petroleum coke can be reduced by 25% to 35%, as compared to the coefficient of thermal conductivity of a corresponding body without petroleum coke.

At this point the invention is explained in detail by means of some examples without restricting the core idea of the invention.

EXAMPLE 1

Polystyrene having a molecular weight of approximately 220,000 g/mol was smelted in an extruder together with 2.5% by weight of calcined petroleum coke, produced in a ball mill, having an average particle diameter of 3.5 µm and an aspect ratio of 20, and with 0.8% by weight of hexabromocyclododecane and 0.1% by weight of dicumyl; treated with 6.5% by weight of pentane; and cooled to about 120° C. The resulting mixture was dispensed from a hole-type die in the form of continuous strands, cooled by way of a cooling bath and pelletized into single pieces by means of the strand pelletizer. The cylindrical granules had a diameter of approximately 0.8 mm and a length of approximately 10.0 mm. Then the granules were foamed to a density of 15 kg/m$^3$. After 24 hours of conditioning, blocks were compression molded thereof and cut into 50 mm thick boards with a hot wire. The boards produced in this way had an average coefficient of thermal conductivity of 32 mW/m·K.

EXAMPLE 2

Polystyrene according to example 1 was melted in an extruder together with 3.0% by weight of calcined petroleum coke, produced in a high velocity jet mill, having an average particle diameter of 4.0 µm and an aspect ratio of 35, and with 0.8% by weight of hexabromocyclododecane and 0.1% by weight of dicumyl; treated with 7.0% by weight of pentane; and cooled according to example 1. The polymer melt was dispensed from a hole-type die in the form of continuous strands having a diameter of 0.75 mm and pelletized into compact granules having a very narrow size distribution by means of a pressurized underwater pelletizer. The granules according to example 1 were foamed to a density of 15 kg/m$^3$ and further processed. The boards had an average coefficient of thermal conductivity of 31 mW/m·K.

EXAMPLE 3

Based on the styrene components, 2% by weight of petroleum coke, produced in a spiral jet mill, having an average particle diameter of 3.0 µm and an aspect ratio of 45, was admixed in an aqueous suspension polymerization process according to the known prior art, and then peroxidically polymerized together with 1.5% by weight of hexabromocyclododecane as the flame retardant agent as well as pentane as the lubricant. The beads that were obtained following isolation of the aqueous phase had an average diameter of 0.8 mm. After the beads were foamed with water steam so as to form boards having a density of 14.5 kg/m$^3$, a coefficient of heat conductivity of 33 mW/m·K could be determined.

EXAMPLE 4

In a continuous operating extruder polystyrene having a molecular weight of 220,000 g/mol is melted together with 1.0% by weight of hexabromocyclododecane and 0.2% by weight of dicumyl as well as 3.8% by weight of calcined petroleum coke, produced in a high velocity jet mill, having an average particle diameter of 4.0 µm and an aspect ratio of 35. The foaming was carried out to the end density directly in the extruder. The polystyrene foam was dispensed continuously from a wide slit die and cooled. The molded articles had a density of 14 kg/m$^3$ and a coefficient of thermal conductivity of 31 mW/m·K.

The petroleum coke-containing molded bodies according to examples 1 to 3 could be classified as low flammable according to DIN 4102-B1.

The invention claimed is:

1. A molded body, comprising polystyrene particle foam or polystyrene rigid foam, wherein the polystyrene particle foam or the polystyrene rigid foam comprises coke particles, wherein the coke particles are calcined petroleum coke particles, and wherein the petroleum coke particles or at least a part of the petroleum coke particles have a platelet-like grain.

2. The body according to claim 1, wherein the petroleum coke particles are distributed homogeneously in the polystyrene particle foam or polystyrene rigid foam.

3. The body according to claim 1, wherein the petroleum coke particles include coke in an isotropic or anistropic form.

4. The body according to claim 1, wherein the petroleum coke particles include needle coke.

5. The body according to claim 1, wherein the petroleum coke particles have an average particle size of 1 μm-50 μm.

6. The body according to claim 1, wherein the petroleum coke particles are milled in mills with delaminating operation.

7. The body according to claim 1, wherein the petroleum coke particles are milled in ball mills.

8. The body according to claim 1, wherein the petroleum coke particles are milled in air-jet mills.

9. The body according to claim 1, wherein the petroleum coke particles have an aspect ratio of 1-500.

10. The body according to claim 1, wherein the petroleum coke particles are included in a quantity of 0.5 weight-%-10 weight-%, related to the finished body.

11. The body according to claim 1, wherein the body has a coefficient of thermal conductivity of 20 mW/(m·K)-40 mW/(m·K).

* * * * *